May 29, 1956
L. HINRICHS
2,747,973
METHOD AND APPARATUS FOR FRACTIONAL
PRECIPITATION OF MIXTURES
Filed Nov. 18, 1953
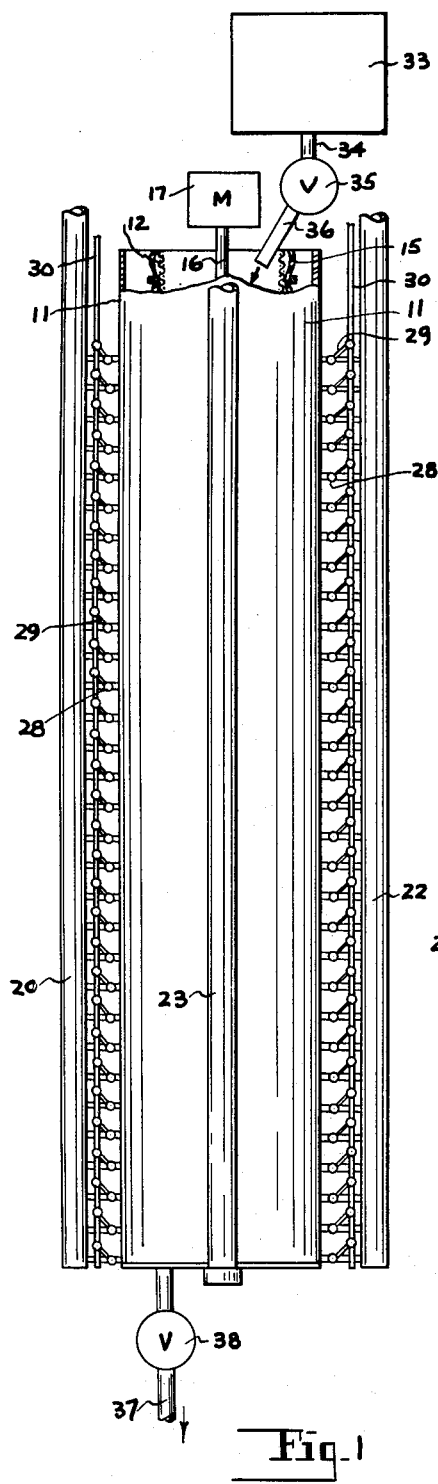
Fig_1
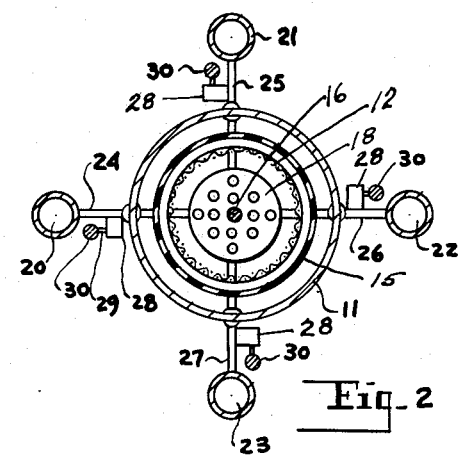
Fig_2
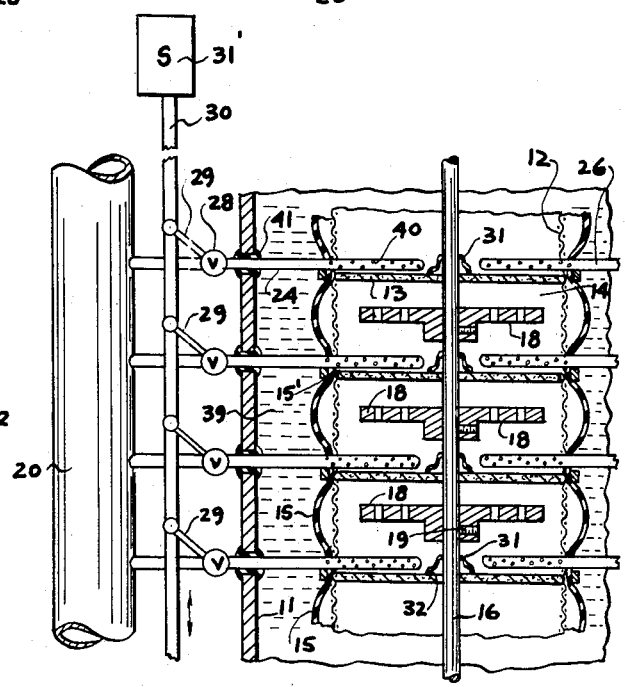
Fig_3
INVENTOR.
LUTHER HINRICHS.
BY
Robert A. Sloman
ATTORNEY.

United States Patent Office 2,747,973
Patented May 29, 1956

2,747,973

METHOD AND APPARATUS FOR FRACTIONAL PRECIPITATION OF MIXTURES

Luther Hinrichs, Detroit, Mich.

Application November 18, 1953, Serial No. 392,872

7 Claims. (Cl. 23—283)

This application is a continuation in part of my copending patent application, Serial Number 321,594, filed November 20, 1952, relating to a method and apparatus for fractional precipitation of mixtures, now abandoned.

This invention relates to a method and apparatus for separating substances of different solubility from mixtures by fractionation precipitation.

Heretofore, where it is desired to separate known elements from a mixture thereof in solution, and wherein the series of elements involved are of similar solubilities, it has required a long and tedious fractional precipitation requiring thousands of alternations, successive precipitation, filtration and dissolving steps, often requiring months of time.

It is the object of the present invention to separate and purify from mixtures substances which are so similar in chemical and physical properties that the usual methods are too tedious and expensive for quantity production.

The present invention relates to a novel method of fractionation precipitation and also to a novel apparatus for accomplishing said method.

The present apparatus and method provide a means for effecting continuous and multiple alternations of precipitation, filtration, and dissolving of mixtures containing substances to be separated therefrom.

These and other objects will be seen from the following specification and claims in conjunction with the appended drawing, in which:

Fig. 1 is a fragmentary elevational view of the present apparatus partially sectioned for illustration.

Fig. 2 is a plan view thereof; and

Fig. 3 is a fragmentary elevational section of said apparatus on an enlarged scale.

The above drawing illustrates one preferred embodiment of the present apparatus for accomplishing the method herein, it being understood that other embodiments are contemplated within the scope of the claims hereafter set forth.

Referring to the drawing, the present apparatus consists of a pair of elongated concentrically arranged upright cylinders 11 and 12.

The outer cylinder 11 is constructed of a fluid impervious substance; and the inner cylinder 12 is constructed of a screening, and is divided into a plurality of vertically spaced cells 14, partitioned from each other by the parallel spaced horizontally arranged filter discs 13, constructed of a suitable material.

The inner cylinder 12 is surrounded by a substantially cylindrical sheet of thin rubber 15, which is secured at a plurality of points throughout the length of cylinder 12 at each filter 13 as by the metallic rings 15'.

Liquids may move upwardly or downwardly between the cells 14, however solids will be retained by the separate filters 13.

The upright impervious covering 15 for the inner cylinder 12 is flexible and is adapted to expand in response to small changes of volume within said cells, as for instance, during a precipitation step in the manner hereafter described. Consequently, the flexible walls 15 of said filter cells thereby provide a safety valve for each cell.

Upright shaft 16 driven by motor 17, Fig. 1, projects centrally up through inner cylinder 12 and loosely through aligned central apertures in each of the filter discs 13.

Circularly shaped stirrers 18 are secured, such as by set screws 19, to shaft 16, one stirrer within each filter cell 14 whereby rotation of said shaft will agitate effectively the mixture within each cell.

A plurality of reagent or other fluid supply tubes 20, 21, 22 and 23 are arranged in spaced relation in an upright position upon the exterior of the outer cylinder 11, preferably at an equal distance from the longitudinal axis of said cylinder.

For example, one tube will contain a reagent, such as an alkaline solution, or an acid solution, or a buffer. Another upright tube will contain a precipitating reagent, such as sodium hydroxide or ammonium hydroxide, for illustration.

When the present process is used in conection with organic mixtures, or a mixture including an organic material, water may be used as a precipitant in one of the tubes 20, 21, 22 or 23, and other of said tubes may contain alcohol, for illustration, for dissolving the precipitated substance.

On the other hand, two different tubes may contain different types of precipitants, as for example, one may contain an alcohol of higher molecular weight, such as methyl alcohol and the other tube would contain propyl alcohol.

When the apparatus is set up for operation, one or more of the upright tubes will contain dissolving solvents such as acids including hydrochloric acid, sulphuric acid or nitric acid, for example; or on the other hand organic solvents may be employed such as acetone, ether, or chloroform. Another of said tubes may contain an eluant.

The present apparatus includes a separate inwardly directed injector tube interconnecting each of the upright tubes 20, 21, 22 and 23, and the interior of each of the filter cells 14.

As shown in Figs. 2 and 3, there are illustrated the four injector tubes 24, 25, 26 and 27, which respectively project radially inward from the upright tubes 20, 21, 22 and 23, extend through the seals 41 in the cylinder 11 and project through the walls of the inner wire cylinder 12, and into the interior of the filter cells 14.

Each of the injectors have secured thereon a suitable fluid control valve 28, which in the present instance, is a rotary type of valve for opening and closing communication through the respective injector tubes.

It is contemplated as part of the present invention that all of the valves on the injectors from a particular upright tube 20, 21, 22, or 23 will be opened and closed simultaneously. For this purpose, there is associated with each set of vertically aligned injector tubes from a particular upright supply tube, an upright vertically reciprocal operating shaft 30, which is connected at one end by a suitable device for effecting a reciprocal movement intermittently, such as by the solenoid 31', shown in Fig. 3 for illustration. There are also provided a number of valve operating links 29, one for each rotary valve, joined at one end to the movable valve element of said valves and with the opposite end of said links pivotally connected to the upright vertically adjustable shaft 30.

By this construction it is apparent that all of the injectors, such as injectors 24 from reagent supply tube 20 will be simultaneously opened momentarily to permit the introduction to each filter cell 14 of the particular solvent or reagent stored within the supply tube 20, for illustration.

As shown in Fig. 3, a suitable sealing device, such as the ring-like boots 31 are positioned within each cell 14 loosely surrounding the shaft 16 at their upper ends, and with their lower ends peripherally secured to an adjacent supporting filter disc 13, as at 32.

The present apparatus also includes a cylindrical container 33, which is suitably supported above the upright cylinders 11 and 12 and which is adapted to contain the fluid mixture, the constituents are to be separated by the present apparatus and process.

Container 33 has an elongated outlet 34 adapted for supplying said mixture to the interior of the inner column 12 under the control of the valve 35 interposed in said outlet, which has a spout 36 for directing said mixture as shown in Fig. 1.

There is also provided a suitable outlet pipe 37 upon the lower end of the interior cylinder 12, which also has a fluid control valve 38 for regulating the downwardly movement of fluid within said cylinder 12.

The outer cylinder 11 contains a suitable liquid 39 which surrounds the rubber covered screen cylinder 12 to thereby maintain a hydrostatic pressure equal to that inside of the rubber walls 15 of the inner tube 12.

The outer ends 40 of the injectors 24, 25, 26 and 27 positioned within the cells 14 are perforated throughout for supplying fine streams of solvent or other fluid into said cell.

*Operation*

(1) In operation the inner column 12 is filled to the top from the bottom, such as through the inlet 37 with a pure solvent of a predetermined specific gravity, as water for illustration. The fluid 39 upon the exterior of the column 12 is of equal specific gravity. It is noted that water would not be used with organic substances.

This upward filling of the column 12 is intended to remove the air from the various cells 14.

This solvent also provides for a uniform downward movement of the mixture from cell to cell throughout its area rather than a channelling of the introduced mixture which might occur if the column of solvent was not there. If the mixture to be precipitated is introduced at the top of the column at 36, equal quantities of solvent are withdrawn through the outlet pipe 37 until the column has been completely filled with the mixture, at which time substantially all of the solvent, water in this case, has been withdrawn.

Fractionating as referred to herein means the fractional precipitation or progressive separate precipitations of a fluid containing certain elements in solution. Ordinarily, in precipitating such a solution, the fluid would be put into one beaker and enough precipitant introduced to effect only a partial precipitation. Naturally, only the less soluble of the elements in the mixture would be precipitated. Thereafter, the mixture would be filtered into a second beaker and the remaining solution would be subjected to a second precipitation. The more soluble elements in the mixture would remain in solution and would be treated in the next independent successive precipitation.

Where the elements in solution have very similar solubilities, the mechanical separation of the elements may take many hundreds of successive precipitation steps before the pure substances are separated.

The present apparatus is adapted to effect the multiple precipitation steps automatically alternating the same with a filtration step and a dissolving step. The present mechanism provides a device whereby the various precipitations are effected automatically and continuously, so that the project of separation can be reduced to a matter of hours or less.

(2) A concentrated solution of the mixture sought to be fractionated, stored within the container 33, upon opening of the valve 35, is slowly passed down into the inner column or cylinder 12, and at the same time a suitable precipitant, from one of the upright tubes 20, 21, 22 and 23, is simultaneously injected into the solution within each of the cells 14 respectively, by the simultaneous opening of the injector valves 28. The injection of the precipitant from one of said upright tubes is such that substantially all of the mixture is precipitated out by the time the solution reaches the bottom of the cylinder 12 as it passes downwardly from cell to cell through the filter discs 13.

(3) It is contemplated that the injection of the precipitant will be for a short period and all of the injectors will be automatically reclosed.

Each of the cells 14 will now retain upon its bottom filter 13, a portion of the original mixture. The first portions within the cells 14 towards the upper end of the cylinder 12 will be richer in the less soluble substances which precipitate out the most quickly. The lower filter cells 14 in the cylinder 12 will be richer in the more soluble substances which precipitate out more slowly.

(4) As the inner cylinder 12 was already full of a pure solvent, such as water, it necessarily follows that upon the introduction of the mixture at the upper end of the cylinder 12, said valve 38 at the outlet 37 will be opened to thereby permit the downward movement of the mixture from cell to cell.

(5) By the time the mixture has entered the lowermost cell, the valve 38 is closed.

(6) A solvent from another of said upright tubes is now simultaneously injected into each of the cells 14, such as by the injectors 25, for dissolving the precipitant within each cell. The dissolving solvent may be an acid or an organic substance as above described.

(7) As a next step, the same precipitating reagent from the supply tube 20, or a different precipitating reagent from another tube such as tube 26, is again injected simultaneously into the solution contained within each of the cells 14 by virtue of the simultaneous opening of the control valves 28 within each of the injectors 24 or 25. This will re-precipitate out the mixture in each cell.

This apparently causes a swelling or increase in volume or a backing up or rising of the precipitated solution in the inner column 12. Consequently, it is necessary that the injection of the precipitant be carefully regulated.

The purpose of this is to free the more solubles from the less solubles, as the mixture is passed down the column 12, one cell at a time by intermittently opening the drain control valve 38 at the bottom of the column.

Fresh mixture may be added at the top of the column 12 to keep the upper filters covered. The original level of fluid within the column 12 may be maintained by drawing off fluid through the outlet 37 as desired.

Throughout the present process, the stirrers 18 may be continuously rotated to effectively agitate the fluids and precipitants within the particular cells.

It is the object of the present invention to provide a fractionation precipitation column which is automatic in operation whereby there may be a continuous automatic alternate precipitation and dissolving of the fluid mixtures, as the mixture is intermittently permitted to pass downwardly from cell to cell. The control of the downward movement is accomplished by the intermittent opening and closing of the valve 38 in the outlet 37.

This process thereby accomplishes in a relative short time a fractionation of the particular mixture which heretofor may have taken many hours and many days.

As a specific problem, there is set out here-below an illustrative example of the use of the above described apparatus.

In the separation of the rare earth metals, there will be more or less of the following elements:

Gadolinium
Terbiuim
Dysprosium
Holmium
Erbium
Thulium
Ytterbium
Lutcium
Lanthanium
Praseodinium
Neodymium
Samarium
Europium This particular group of rare earth metals, of which there may be others, all have known and different solubilities. Some are very close as to solubility, and in others the solubility is greater. These earth metals have certain pyrophoric characteristics, which permit their use in the manufacture of flints for certain cigarette lighters, for illustration.

By spectro-scopic analysis of a given fluid containing some of the above earth metals, it can be ascertained which of the above elements are contained therein. If it is determined that there are three of these elements in the solution of different known solubilities but close in the series, then the present apparatus will be used to effect a separation and isolation of the various elements contained in the solution.

The elements involved will be in the form of salts to render them soluble.

For example, if the solution contains (1) neodymium; (2) samarium and (3) europium, listed in the order of increasing solubility, for illustration, then the present apparatus may be used and after a long series of mechanically controlled fractionating steps, i. e., precipitation, filtering and dissolving, successively and alternately. It will be found that element No. 1 will be most concentrated at the top of the column shown in Fig. 1, as it is the least soluble of the three elements; whereas below this layer there will be a mixture of neodymium and samarium. Approximately at the center of the column, there will be a mixture of all three elements, therebelow there will be a strata or mixture of samarium and europium, i. e., Nos. 2 and 3 elements. At the bottom of the column there will be a layer of concentrated europium.

While the No. 1 and No. 3 elements are substantially concentrated at the top and bottom of the columns, nevertheless the concentration of the No. 1 substance will include some of the No. 2 substance.

Furthermore, the concentration of the No. 3 substance at the bottom will also include some of the No. 2 substance.

As a next step, the material of the top of the column will be removed and put back into the solution, and this solution will be again fractionated through the device in the same manner again described. After this second fractionation, there will have been effected a separation between the No. 1 and No. 2 substances with the No. 1 substance in concentrated form at the top of the column and with the No. 2 substance in concentrated form at the bottom of the column. Similarly, the prior concentration of the No. 3 element containing some of the No. 2 element will also be separately fractionated by the same apparatus. The result of this fractionation will be that the No. 2 element or less soluble of the two elements will be at the top of the column, and there will be a concentration of the No. 3 element, the europium at the bottom of the column.

In this specific example the precipitant employed was ammonium hydroxide, the dissolving agent was hydrochloric acid.

The fractionating precipitations were carried on at room temperatures. The concentration of the precipitant and the dissolving solvent or acids were of a dilute form.

As above described in detail, the precipitant ammonium hydroxide was simultaneously introduced into each of the filter cells 14 through one set of injector tubes. However, this introduction of the precipitant is for only a short period as it is desired that in the initial precipitation only the least soluble element in the solution will be precipitated out. This means that the valves 29 are only momentarily opened and reclosed.

Next, the valve 38 is opened momentarily permitting the remaining solution to move downwardly a short distance as from one filter cell 14 to the next lower cell, and the valve 38 is again closed. As a next step, there is injected into each of the cells simultaneously, a small supply of dissolving solvent, i. e. hydrochloric acid. The valves which control the flow of the hydrochloric acid are only momentarily opened.

Having described my invention, reference should now be had to the claims which follow for determining the scope thereof.

I claim:

1. Fractionation apparatus comprising an upright fluid impervious cylinder, a plurality of longitudinally spaced horizontally positioned filter discs in superimposed relation to each other within said cylinder throughout substantially its length defining a plurality of aligned cells, a container above said cylinder adapted for delivering a fluid mixture thereinto, a pair of upright supply tubes adjacent said cylinder adapted to contain different reagents under pressure, a plurality of parallel horizontally arranged injector tubes joined at their one ends in communication with the interior of one of said supply tubes with their other ends extending into a cell respectively, adapted to deliver momentarily a precipitant to each of said cells simultaneously, an outlet drain at the bottom of said cylinder intermittently openable and adapted to permit downward filtration movements of the non-precipitated contents of one cell to an adjacent cell, a plurality of parallel horizontally arranged injector tubes joined at their one ends in communication with the interior of the other supply tube, with their other ends extending into a cell respectively, adapted to deliver momentarily a dissolving solvent alternately to each of said cells simultaneously, a flow control valve in each of said injector tubes, each valve having an adjustable valve element, and separate reciprocal shafts joined respectively to the valve elements of each set of injector tubes.

2. The apparatus of claim 1, and an automatically operable mechanical means joined to each shaft for effecting continuous alternative reciprocations thereof.

3. The apparatus of claim 1, an upright rotatable shaft supported within said cylinder and extending centrally through said cells, stirring means in each cell joined to said shaft, and power means for continuously rotating said shaft.

4. The apparatus of claim 1, said cylinder including a cylindrical frame of wire mesh and a flexible resilient rubber cylinder surrounding said frame, and means peripherally secured around said rubber cylinder at the top and bottom of each cell whereby the walls of said cell are expandable.

5. The apparatus of claim 1, said cylinder including a cylindrical frame of wire mesh and a flexible resilient rubber cylinder surrounding said frame, means peripherally secured around said rubber cylinder at the top and bottom of each cell whereby the walls of said cell are expandable, and a second upright cylinder concentrically positioned around said first cylinder and containing a fluid of substantially the same specific gravity as the fluid mixture within said first cylinder.

6. The apparatus of claim 1, said cylinder including a cylindrical frame of wire mesh and a flexible resilient rubber cylinder surrounding said frame, means peripherally secured around said rubber cylinder at the top and bottom of each cell whereby the walls of said cell are expandable, and a second upright cylinder concentrically positioned around said first cylinder and containing a fluid of substantially the same specific gravity as the fluid mixture within said first cylinder, said injector tubes extending through the walls of said second cylinder.

7. The apparatus of claim 1, the ends of said injector tubes being perforated throughout the portions thereof within said cells.

No references cited.